(12) United States Patent  
Morita et al.

(10) Patent No.: US 10,640,123 B2
(45) Date of Patent: May 5, 2020

(54) DRIVER MONITORING SYSTEM

(71) Applicant: DENSO CORPORATION, Kariya, Aichi-pref. (JP)

(72) Inventors: Hidetoshi Morita, Kariya (JP); Masashi Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/780,056

(22) PCT Filed: Feb. 27, 2017

(86) PCT No.: PCT/JP2017/007544
§ 371 (c)(1),
(2) Date: May 30, 2018

(87) PCT Pub. No.: WO2017/150466
PCT Pub. Date: Sep. 8, 2017

(65) Prior Publication Data
US 2018/0345980 A1 Dec. 6, 2018

(30) Foreign Application Priority Data

Feb. 29, 2016 (JP) .................................. 2016-037694
Dec. 27, 2016 (JP) .................................. 2016-253786

(51) Int. Cl.
*B60W 40/08* (2012.01)
*B60W 50/14* (2020.01)
(Continued)

(52) U.S. Cl.
CPC ............ *B60W 40/08* (2013.01); *B60W 50/14* (2013.01); *G05D 1/0061* (2013.01);
(Continued)

(58) Field of Classification Search
None
See application file for complete search history.

(56) References Cited

U.S. PATENT DOCUMENTS 4,144,531 A * 3/1979 Anbergen ............ A61B 5/1103
340/575
4,359,724 A * 11/1982 Zimmerman .......... G08B 21/06
340/575
(Continued)

FOREIGN PATENT DOCUMENTS

JP 5139470 B2 2/2013
JP 2014-154901 A 8/2014
(Continued)

*Primary Examiner* — Curtis J King
(74) *Attorney, Agent, or Firm* — Posz Law Group, PLC

(57) ABSTRACT

A driving monitoring system monitors a driver of a host vehicle by a vehicle control unit and a portable terminal which communicate with each other. The vehicle control unit controls the host vehicle. The portable terminal includes a display screen and a camera arranged to capture an image of an area opposing the display screen. The driver monitoring system determines whether the driver of the host vehicle looks at the display screen of the portable terminal during running of the host vehicle, based on an image captured by the camera; the driver monitoring system issues a warning in response to that the driver is determined to be looking at the display screen of the portable terminal.

33 Claims, 8 Drawing Sheets

(51) Int. Cl.
*G06K 9/00* (2006.01)
*G05D 1/00* (2006.01)

(52) U.S. Cl.
CPC ....... *G05D 1/0088* (2013.01); *G06K 9/00845* (2013.01); *B60W 2040/0818* (2013.01); *B60W 2050/143* (2013.01); *B60W 2050/146* (2013.01); *G05D 2201/0213* (2013.01); *G06K 9/00288* (2013.01)

(56) References Cited

U.S. PATENT DOCUMENTS

| | | | | |
|---|---|---|---|---|
| 4,725,824 A * | 2/1988 | Yoshioka | ............... | G08B 21/06 340/575 |
| 4,953,111 A * | 8/1990 | Yamamoto | ........... | A61B 5/1103 340/575 |
| 5,239,337 A * | 8/1993 | Takagi | ............... | G03B 7/091 396/242 |
| 5,311,877 A * | 5/1994 | Kishi | ............... | G08B 21/06 340/575 |
| 5,570,698 A * | 11/1996 | Liang | ............... | A61B 3/113 340/575 |
| 5,689,241 A * | 11/1997 | Clarke, Sr. | ............... | A61B 5/18 340/575 |
| 5,786,765 A * | 7/1998 | Kumakura | ............... | G08B 21/06 340/575 |
| 5,795,306 A * | 8/1998 | Shimotani | ............... | A61B 5/1103 600/558 |
| 6,304,187 B1 * | 10/2001 | Pirim | ............... | B60R 1/04 340/573.1 |
| 6,400,835 B1 * | 6/2002 | Lemelson | ............... | B60Q 1/0023 307/10.5 |
| 6,661,345 B1 * | 12/2003 | Bevan | ............... | G08B 21/06 340/575 |
| 7,301,464 B2 * | 11/2007 | Coulter | ............... | B60K 28/066 340/573.1 |
| 7,301,465 B2 * | 11/2007 | Tengshe | ............... | G08B 21/06 340/575 |
| 7,344,251 B2 * | 3/2008 | Marshall | ............... | A61B 3/112 351/210 |
| 7,438,418 B2 * | 10/2008 | Marshall | ............... | A61B 5/16 351/210 |
| 7,602,947 B1 * | 10/2009 | Lemelson | ............... | B60Q 1/0023 340/426.1 |
| 8,340,368 B2 * | 12/2012 | Lee | ............... | C23C 8/80 280/730.1 |
| 8,494,481 B1 * | 7/2013 | Bacco | ............... | G08B 25/005 455/404.1 |
| 9,858,832 B1 * | 1/2018 | Hsu-Hoffman | ........ | G09B 19/14 |
| 9,888,874 B2 * | 2/2018 | Nakajima | ............... | A61B 5/0075 |
| 10,053,001 B1 * | 8/2018 | Nabbe | ............... | B60Q 1/50 |
| 2002/0113943 A1 * | 8/2002 | Trajkovic | ............... | G02B 7/102 351/209 |
| 2004/0070509 A1 * | 4/2004 | Grace | ............... | A61B 5/1103 340/575 |
| 2004/0090334 A1 * | 5/2004 | Zhang | ............... | B60K 28/066 340/575 |
| 2004/0150514 A1 * | 8/2004 | Newman | ............... | B60Q 9/008 340/435 |
| 2004/0181168 A1 * | 9/2004 | Plant | ............... | A61B 3/113 600/558 |
| 2004/0239509 A1 * | 12/2004 | Kisacanin | ............... | A61B 5/18 340/575 |
| 2005/0030184 A1 * | 2/2005 | Victor | ............... | B60K 28/06 340/576 |
| 2005/0159893 A1 * | 7/2005 | Isaji | ............... | G01S 17/023 701/301 |
| 2006/0011399 A1 * | 1/2006 | Brockway | ............... | A61B 5/18 180/272 |
| 2006/0031005 A1 * | 2/2006 | Sakano | ............... | G01C 21/3638 701/455 |
| 2006/0083409 A1 * | 4/2006 | Yuzawa | ............... | G06Q 10/10 382/116 |
| 2006/0103539 A1 * | 5/2006 | Isaji | ............... | B60J 3/04 340/575 |
| 2006/0235615 A1 | 10/2006 | Kato et al. | | |
| 2007/0009139 A1 * | 1/2007 | Landschaft | ............. | H04M 1/66 382/115 |
| 2007/0252674 A1 * | 11/2007 | Nelson | ............... | G06T 1/00 340/5.53 |
| 2008/0150734 A1 * | 6/2008 | Johns | ............... | A61B 5/18 340/575 |
| 2009/0015425 A1 * | 1/2009 | Palmqvist | ........... | H04M 1/0245 340/686.6 |
| 2009/0076673 A1 * | 3/2009 | Brabec | ................ | A01B 69/008 701/23 |
| 2009/0109400 A1 * | 4/2009 | Yoshinaga | ............. | A61B 3/113 351/210 |
| 2011/0199202 A1 * | 8/2011 | De Mers | ................ | A61B 5/18 340/439 |
| 2011/0316666 A1 * | 12/2011 | Noma | ..................... | G06F 21/32 340/5.53 |
| 2012/0300061 A1 * | 11/2012 | Osman | ................ | G06F 1/3231 348/135 |
| 2012/0306637 A1 * | 12/2012 | McGough | ............. | B60K 37/06 340/439 |
| 2013/0015946 A1 * | 1/2013 | Lau | ........................ | G07C 9/00 340/5.2 |
| 2013/0322705 A1 * | 12/2013 | Wong | ..................... | G06F 21/32 382/118 |
| 2014/0093140 A1 * | 4/2014 | Juveneton | .......... | G06K 9/00906 382/117 |
| 2014/0143061 A1 * | 5/2014 | Abhyanker | ............ | G06Q 50/01 705/14.58 |
| 2014/0197922 A1 * | 7/2014 | Stanwood | .............. | G06F 21/32 340/5.83 |
| 2014/0225725 A1 * | 8/2014 | Takahashi | ............. | B60K 28/02 340/439 |
| 2014/0347458 A1 * | 11/2014 | Tijerina | ................ | G06K 9/00369 348/77 |
| 2014/0375810 A1 * | 12/2014 | Rodriguez | ............. | B60Q 1/50 348/148 |
| 2015/0010207 A1 * | 1/2015 | Inada | ..................... | B60K 35/00 382/103 |
| 2015/0070160 A1 * | 3/2015 | Davidsson | ............. | B60K 28/06 340/457 |
| 2015/0077258 A1 * | 3/2015 | Nelson | ................ | G08B 21/245 340/573.1 |
| 2015/0103312 A1 * | 4/2015 | Paille | ..................... | G02C 7/025 351/204 |
| 2015/0116197 A1 * | 4/2015 | Hamelink | ............... | G06F 3/013 345/156 |
| 2015/0142244 A1 * | 5/2015 | You | ....................... | G05D 1/0061 701/23 |
| 2015/0164323 A1 * | 6/2015 | Holtzclaw | ............ | A61B 5/0022 600/365 |
| 2015/0175070 A1 * | 6/2015 | Attard | ..................... | B60R 1/00 340/439 |
| 2015/0178998 A1 * | 6/2015 | Attard | ..................... | G07C 5/008 701/23 |
| 2015/0182132 A1 * | 7/2015 | Harris | ................ | A61B 5/0295 340/870.01 |
| 2015/0198448 A1 * | 7/2015 | Sanma | .................. | G08G 1/166 701/400 |
| 2015/0210292 A1 * | 7/2015 | George-Svahn | ...... | B60W 50/10 701/45 |
| 2015/0221341 A1 * | 8/2015 | Akay | ...................... | H04N 5/77 386/278 |
| 2015/0223064 A1 * | 8/2015 | Takemura | .............. | B60K 35/00 455/411 |
| 2015/0258997 A1 * | 9/2015 | Nilsson | ................ | B60W 40/09 340/576 |
| 2015/0302737 A1 * | 10/2015 | Geerlings | .............. | G08C 17/02 340/5.25 |
| 2015/0325104 A1 * | 11/2015 | Greenhut | ............... | H04W 4/12 340/576 |
| 2015/0338852 A1 * | 11/2015 | Ramanujam | ........... | G01C 21/26 701/2 |

(56) References Cited

U.S. PATENT DOCUMENTS

| | | | | |
|---|---|---|---|---|
| 2015/0339527 A1* | 11/2015 | Plummer | ............ | G06K 9/00845 348/78 |
| 2016/0063854 A1* | 3/2016 | Burton | .................. | G08C 17/02 340/12.5 |
| 2016/0146618 A1* | 5/2016 | Caveney | ............... | B60W 30/00 701/25 |
| 2016/0148064 A1* | 5/2016 | Heo | .................. | G06K 9/00845 348/148 |
| 2016/0176372 A1* | 6/2016 | Kim | ........................ | E05F 15/73 701/49 |
| 2016/0212253 A1* | 7/2016 | Akama | ............. | G01C 21/3664 |
| 2016/0302662 A1* | 10/2016 | Suzuki | .................. | G01B 11/25 |
| 2016/0370801 A1* | 12/2016 | Fairfield | ............. | G05D 1/0038 |
| 2017/0004354 A1* | 1/2017 | Noridomi | ............ | G06K 9/6262 |
| 2017/0028987 A1* | 2/2017 | Yamada | ................ | B60W 50/08 |
| 2017/0038774 A1* | 2/2017 | Ebina | .................. | B60W 50/14 |
| 2017/0043715 A1* | 2/2017 | Osugi | ...................... | G08G 1/16 |
| 2017/0061222 A1* | 3/2017 | Hoye | ................ | G06K 9/00845 |
| 2017/0108864 A1* | 4/2017 | Wiklinska | .......... | G06K 9/00832 |
| 2017/0166122 A1* | 6/2017 | Ando | ..................... | B60Q 9/00 |
| 2017/0168610 A1* | 6/2017 | Myung | .................. | G06F 3/044 |
| 2017/0221453 A1* | 8/2017 | Asada | ..................... | G06F 3/048 |
| 2017/0236210 A1* | 8/2017 | Kumar | .................. | B60W 10/30 705/4 |
| 2017/0240109 A1* | 8/2017 | Kimura | .................... | B60R 1/00 |
| 2017/0248954 A1* | 8/2017 | Tomatsu | .................. | B60W 40/08 |
| 2017/0316581 A1* | 11/2017 | Ewert | ....................... | G06T 7/74 |
| 2017/0364070 A1* | 12/2017 | Oba | ....................... | B60W 50/14 |
| 2018/0017858 A1* | 1/2018 | Dominguez-Montes | .................... | G03B 35/24 |
| 2018/0024627 A1* | 1/2018 | McNew | .................. | G06F 3/013 345/156 |
| 2018/0113474 A1* | 4/2018 | Koda | ........................ | G08G 1/09 |
| 2018/0134285 A1* | 5/2018 | Cho | .......................... | B60W 10/06 |
| 2018/0203455 A1* | 7/2018 | Cronin | .................. | B60W 50/14 |
| 2018/0229654 A1* | 8/2018 | Unver | ...................... | H04W 4/48 |
| 2018/0229743 A1* | 8/2018 | Aoi | ....................... | B60W 30/182 |
| 2018/0281684 A1* | 10/2018 | Boyce | ........................ | B60R 1/08 |
| 2018/0329414 A1* | 11/2018 | Igarashi | ................ | B60W 50/14 |
| 2019/0056732 A1* | 2/2019 | Aoi | ....................... | B60W 50/14 |
| 2019/0302755 A1* | 10/2019 | Mori | .................... | G05D 1/0022 |
| 2019/0302756 A1* | 10/2019 | Mori | .................... | G05D 1/0027 |

FOREIGN PATENT DOCUMENTS

| | | |
|---|---|---|
| JP | 2015-032054 A | 2/2015 |
| JP | 2015-182525 A | 10/2015 |
| JP | 2015-217798 A | 12/2015 |
| WO | 2009069235 A1 | 6/2009 |

* cited by examiner

FIG. 9

| CONTENT OF CALLING ATTENTION BY SAFETY CONTROLLER SECTION |
|---|
| CONTROL OF RUNNING STATE OF VEHICLE, SOUND, SPEECH, LIGHT, VIBRATION, WIND, TEMPERATURE |

FIG. 10

| (PART OR ALL OF) PROCESSES OF OCCUPANT DETERMINER SECTION SHARED BY: |
|---|
| PORTABLE TERMINAL, CONTROL UNIT OF HOST VEHICLE, CONTROL UNIT OF DIFFERENT VEHICLE, APPARATUS OTHER THAN VEHICLE (E.G., CLOUD) |

DRIVER MONITORING SYSTEM

CROSS REFERENCE TO RELATED APPLICATIONS

The present application is a U.S. national stage application of International Application No. PCT/JP2017/007544 filed on Feb. 27, 2017 and claims priority based on Japanese Patent Application No. 2016-37694 filed on Feb. 29, 2016 and Japanese Patent Application No. 2016-253786 filed on Dec. 27, 2016, the disclosures of which are incorporated herein by reference.

TECHNICAL FIELD

The present disclosure relates to a driver monitoring system capable of monitoring a state of a driver who is seated on a driver's seat in such cases as an automated driving.

BACKGROUND

There is conventionally known a technology as a driver monitoring system which monitors a state of a driver who drives a vehicle; the technology captures an image of a face of a driver in a vehicle with an in-vehicle camera, detects an opening and closing state of eyelids or a direction of a sight line based on the face image, and recognizes the driver's state.

Further, when the driver's state is determined by the technology to be the state which is inappropriate for driving, an alerting technique is provided to alert the driver by using various kinds of methods. Such an alerting technique uses displaying via an in-vehicle display; speech announcing via a speaker; winding up of the seat belt; or vibrating the seat, for instance.

In addition, technologies of automated driving have been developed in recent years; even in such an automated driving, there may be arising a situation where the driver intervenes in the driving in some way. For instance, during an automated driving, a front camera or radar may fail to detect a road condition with a sufficient accuracy, causing a situation unsuitable for the automated driving.

A countermeasure responding to such a situation is known which determines whether a situation is suitable and alerts the driver upon determining the situation unsuitable for the automated driving. A technique for such alerting is disclosed which determines a wakefulness of the driver based on the opening and closing state of the eyelids and provides an appropriate alert (refer to Patent literature 1).

PRIOR ART LITERATURES

Patent Literature

Patent literature 1: JP 2015-032054 A

SUMMARY

The inventors' detailed study finds the above technique possibly involving an issue unable to always respond suitably. For instance, suppose a case where a certain level of the automated driving allows the driver to release the hand from the steering wheel. Such a case may fail to detect a state of the driver successfully if the driver manipulates a portable terminal (i.e., portable unit) such as a smart phone. That is, the technology, which captures an image of the face of the driver with the in-vehicle camera and determines a state of the driver from the face image, cannot acquire any face image with the in-vehicle camera if the driver looks at a screen of a portable terminal on hand. This results in failing to determine the state of the driver.

The automated driving, which may be not continued depending on a situation, requires the driver to be in a state prepared for a backup task. That is, even when the driver releases the hand from the steering wheel, the driver is required to be in a state ready for performing the dynamic driving task.

The automated driving is thus required to monitor whether the driver is in a state ready for a backup task and alert the driver if the driver fails to be in the state ready for a backup task, such that the drive is sleeping.

In the above, a conventional technique using an in-vehicle camera however fails to acquire a face image, posing an issue that cannot determine whether the driver is in a state ready for a backup task. In addition, suppose a case where any automated driving is not performed. Even in such a case, the conventional technique finds a difficult in recognizing the state of the driver if the in-vehicle camera is not under the state suitable for capturing images.

An aspect of the present disclosure provides a driving monitoring system capable of recognizing the state of the driver and responding to the driver such as issuing an appropriate warning in cases where the driver manipulates a portable unit during running of the host vehicle with the automated driving.

An example of the present disclosure relates to a driving monitoring system monitoring a driver of a host vehicle by a portable unit and a vehicle control unit which communicate with each other. The portable unit includes a display screen and an image capture apparatus arranged to capture an image of an area opposing the display screen; the vehicle control unit controls the host vehicle.

The driving monitoring system is provided to include an occupant state determiner section and a safety controller section. The occupant state determiner section determines whether the driver of the host vehicle looks at the display screen of the portable unit during running of the host vehicle, based on an image captured by the image capture apparatus. The safety controller section issues a warning in response to that the occupant state determiner section determines that the driver looks at the display screen of the portable unit.

Such a configuration can thus determine whether the driver of the host vehicle looks at the display screen of the portable unit during running of the host vehicle, based on the image captured by the image capture apparatus. This can issue an appropriate warning when the driver is determined to be looking at the display screen of the portable unit. That is, the state of the driver can be recognized so as to issue an appropriate warning (i.e., alert); this provides an advantageous effect allowing the safe driving.

Another example of the present disclosure relates to a driving monitoring system monitoring a driver of a host vehicle by a portable unit and a vehicle control unit which communicate with each other. The portable unit includes a display screen and an image capture apparatus arranged to capture an image of an area opposing the display screen; the vehicle control unit controls the host vehicle.

The driving monitoring system is provided to include an occupant state determiner section and a safety controller section. The occupant state determiner section determines whether the driver of the host vehicle looks at the display screen of the portable unit during an automated driving of the host vehicle, based on an image captured by the image capture apparatus. The safety controller section performs at least either a control of issuing a warning or a control of providing information used in driving by the driver, in response to that the occupant state determiner section determines that the driver looks at the display screen of the portable unit.

Such a configuration can thus determine whether the driver of the host vehicle looks at the display screen of the portable unit during an automated driving of the host vehicle, based on the image captured by the image capture apparatus. This can issue an appropriate warning when the driver is determined to be looking at the display screen of the portable unit. That is, the state of the driver can be recognized so as to issue an appropriate warning; this provides an advantageous effect allowing the safe driving.

Suppose a case where, in particular, in an automated driving, the driver is supposed to manipulate the portable unit while releasing the hand from the steering wheel. Against such a case, the above configuration can comprehend a degree of the driver's consciousness from the driver's image (for example, face image) captured by the image capture apparatus of the portable unit during the automated driving.

Suppose a case where the driver is not under the state of taking over the driving task immediately from the automated driving, or the driver is not under the state enabling a backup task. A necessary warning can be issued in response to such a case. This exhibits a significant effect in enhancing safety in driving.

Further, suppose a case where a driver looks at a display screen of the portable unit during an automated driving, and the driver then starts driving by replacing the automated driving. In such a case, the display screen may be enabled to display the information necessary for the driver, like the useful information in a backup task such as an image in front of the vehicle or environmental information. This provides an advantage effect improving the safety much further.

Note that at least one of or both of an occupant state determiner section and a safety controller section may be included in one of or both of a portable unit and a host vehicle.

BRIEF DESCRIPTION OF DRAWINGS

FIG. 9 is a diagram for explaining contents of alerts by a safety controller section; and FIG. 10 is a diagram for explaining apparatuses which perform a process by an occupant state determiner section.

EMBODIMENTS FOR CARRYING OUT INVENTION

The following explains embodiments of the present disclosure with reference to the drawings.

1. First Embodiment

[1-1. Basic Configuration]

First, a configuration of a driver monitoring system according to a first embodiment will be explained.

Figure 1:
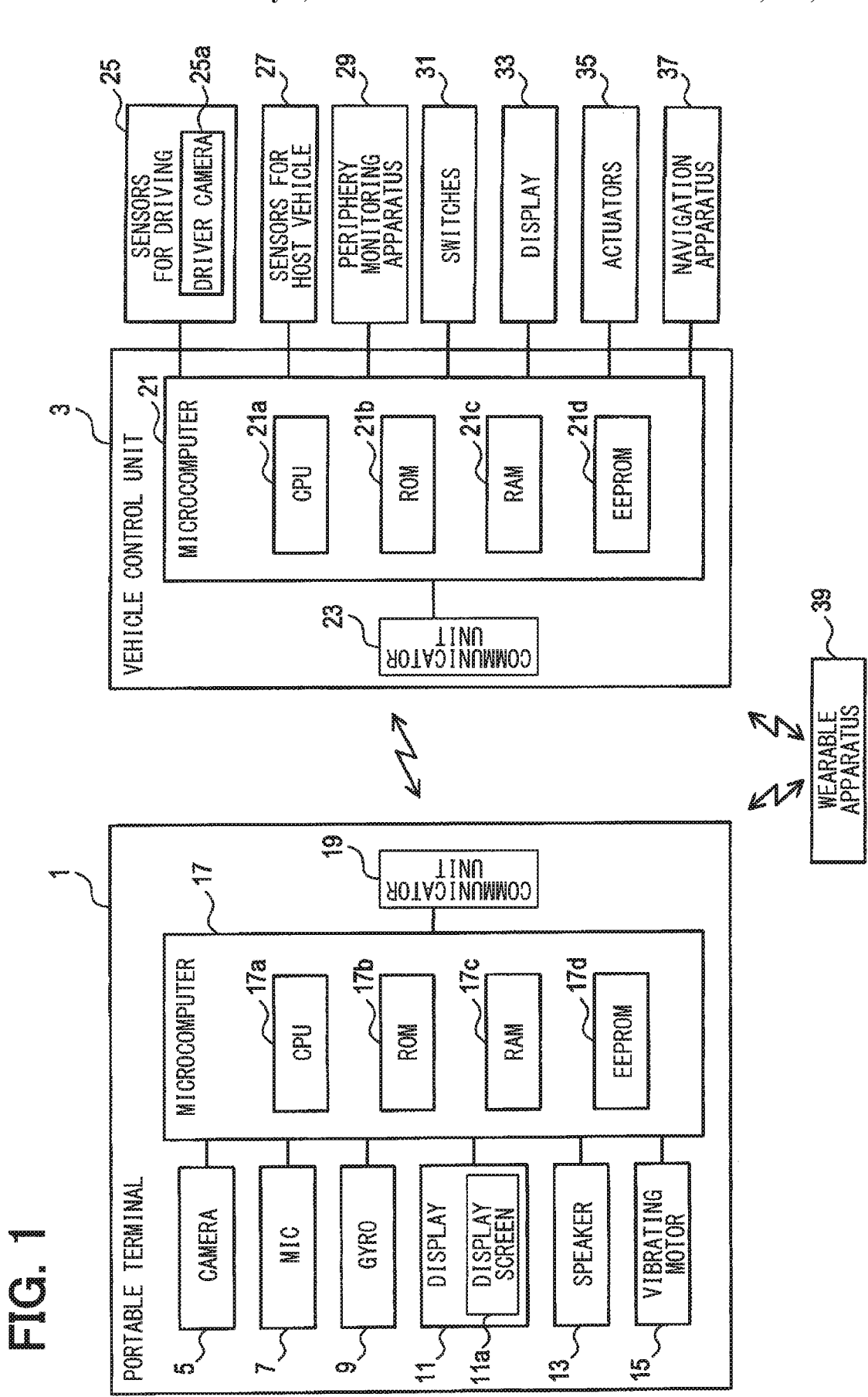
FIG. 1 is a block diagram illustrating a configuration of a driver monitoring system according to a first embodiment.

As illustrated in FIG. 1, a driving monitoring system according to the present first embodiment functions in cooperation via a communication between (i) a portable terminal 1 such as a smart phone, and (ii) a vehicle control unit 3 mounted in a vehicle to control an operation of the vehicle.

The vehicle is enabled to run by (i) a driving operation by a driver and (ii) an automated driving according to the various levels of automation. Note that the vehicle is a host vehicle that is enabled to communicate with a portable terminal 1 of the driver.

The following explains respective configurations.

<Portable Terminal>

The portable terminal 1, which is a known type of a communication apparatus (i.e., a portable unit) carried by the driver etc., is enabled to perform the transmission and reception of the information with an external base station or the host vehicle.

Note that the present embodiment explains a smart phone as the portable terminal 1. However, there is no need to be limited thereto. In addition, the portable terminal 1 may be replaced by any one of apparatuses, such as a game machine, a notebook PC. In this case, an input apparatus corresponding to each apparatus may be used which includes a manipulation switch or a keyboard.

The portable terminal 1 includes a camera 5, a microphone 7, a gyroscope 9, a display 11, a speaker 13, and a vibrating motor 15; in addition, it includes a microcomputer 17 which controls an operation of the portable terminal 1, and a communicator unit 19 which includes an antenna communicating with an external source. The communicator unit 19 may employ an apparatus which operates a cable communication such as using USB without being limited to a wireless communication.

The camera 5, which is a CCD camera, e.g., is arranged on the side of the display 11 (i.e., on the side of a display screen 11a) so as to capture an image of a face of a manipulator such as a holder of the portable terminal 1. That is, the camera 5 is arranged around the display screen 11a so as to capture an image of an area which opposes or faces the side of the display screen 11a.

The display 11 is a display apparatus, which includes the display screen 11a such as a liquid crystal, displays texts or images on the display screen 11a. Note that, as conventionally known, the display screen 11a has a function as a touch panel, i.e., the function as an input apparatus. Further, the display 11 may not have the function as an input apparatus.

The speaker 13 notifies a user of the portable terminal 1 of the information such as a warning via a speech or a sound, as needed. The vibrating motor 15 notifies a user of the portable terminal 1 of the information such as a warning by vibrating the portable terminal 1 itself.

The microcomputer 17 is a well-known electronic control unit including a CPU 17a, a ROM 17b, a RAM 17c, and an EEPROM 17d. The ROM 17b stores data or programs that need to be constantly held even if the power source is disconnected. The EEPROM 17d stores data such as certification data that need to be constantly held even if the power source is disconnected. The RAM 17c stores data temporarily. The CPU 17a executes various processes according to programs stored in the ROM 17b, for instance.

The communicator unit 19 is an apparatus which can transmit and receive various kinds of information such as data of a face image captured by the camera 5, with an external base station or the vehicle control unit 3. The communicator unit 19 is enabled to communicate with the vehicle control unit 3, via a wireless communication or a wired communication.

The portable terminal 1 has the various kinds of functions that are achieved by the CPU 17a executing the program stored in the non-transitory tangible storage medium. In this example, the ROM 17b corresponds to a non-transitory tangible storage medium which stores a program. In addition, a method corresponding to the program is executed by executing the program. The portable terminal 1 may include one or more microcomputers. The above aspects of the microcomputer(s) are similarly applied to a microcomputer 21 of the vehicle control unit 3.

<Vehicle Control Unit>

The vehicle control unit 3 is an electronic control unit that controls an operation of a vehicle by activating the various actuators based on the information from the various kinds of sensors or performs a driver monitoring process to be mentioned later.

The vehicle control unit 3 includes (i) a known microcomputer 21 having a CPU 21a, a ROM 21b, a RAM 21c, and an EEPROM 21d, and (ii) a communicator unit 23 that transmits or receives the information via an antenna with an external base station, a different vehicle, or the portable terminal 1. The communicator unit 23 is enabled to communicate with the communicator unit 19 of the portable terminal 1, via a wireless communication or a wired communication. The vehicle control unit 3 is connected with components such as sensors 25 for driving, sensors 27 for the host vehicle, a periphery monitoring apparatus 29, switches 31, a display 33, actuators 35, and a navigation apparatus 37.

The microcomputer 21 is the same as the microcomputer 17 of the portable terminal 1 basically. The sensors 25 for driving include various kinds of sensors, such as a driver camera 25a which detects the state of the driver. The driver camera 25a is, e.g., a CCD camera arranged in front of the driver's seat to capture an image of a face of the driver and transmit the image of the face to the vehicle control unit 3.

Other sensors include a sitting sensor which detects that the driver is seated in the driver's seat, and an electrocardiography sensor which is attached to the steering wheel or the seat belt to detect the driver's heartbeat.

The sensors 27 for the host vehicle, which detect an operation of the host vehicle, include a speed sensor, an acceleration sensor, a yaw rate sensor, and a steering sensor. The sensors for the host vehicle further include an apparatus that detects a position of the host vehicle, such as a GPS receiver.

The periphery monitoring apparatus 29, which monitors a situation around the vehicle (that is, host vehicle), includes a radar, a front camera, a rear camera, a lateral camera, and an ultrasonic sensor.

The switches 31 include a switch which designates permission or prohibition of an automated driving. The display 33 is attached to a dashboard of the vehicle, e.g.; its display screen has a function as a touch panel, i.e., the function as an input apparatus.

The actuators 35 include an actuator for driving which adjusts the driving force of the vehicle using the throttle, an actuator for braking which adjusts the braking force of the vehicle using the wheel cylinder, and an actuator for steering which adjusts the steering angle of the vehicle using the motor for steering. In addition, an air-conditioner, a speaker, and an indoor light may be included.

The navigation apparatus 37 is a known apparatus, which provides a guidance of a travel route based on the map information or the position information on the host vehicle. Further, the driver monitoring system may use a wearable apparatus 39 in addition to the portable terminal 1 and the vehicle control unit 3. The wearable apparatus 39 detects a heartbeat, a pulse, and an electroencephalogram of the driver and transmits the detected information to the portable terminal 1 or the vehicle control unit 3.

The wearable apparatus 39 includes a wrist watch type or a headgear type attached to the head.

[1-2. Stored Contents of Memory]

The following explains stored contents in a memory of the portable terminal 1 or vehicle control unit 3; the stored contents are stored to perform a driver monitoring process.

<Portable Terminal>

Figure 2:
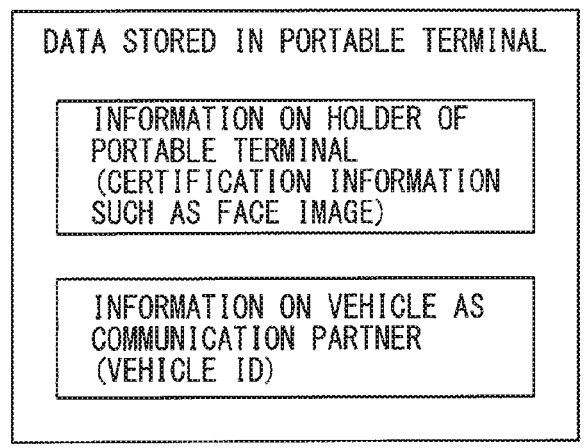
FIG. 2 is a diagram for explaining data stored in a memory of a portable terminal.

As indicated in FIG. 2, the memory (for example, EEPROM 17d) of the portable terminal 1 stores the information on a holder of the portable terminal 1 to be registered previously.

This information on the holder includes the certification information based on the face image which can identify the holder; it further includes various kinds of certification information, such as a retina, a palm, and a fingerprint. In addition, the EEPROM 17d stores the information on the vehicle as a communication partner of the portable terminal 1 at the present control, i.e., the information on the host vehicle that the holder of the portable terminal 1 is permitted to drive. The information on the vehicle includes a number (for example, vehicle ID) which identifies the vehicle.

<Vehicle Control Unit>

Figure 3:
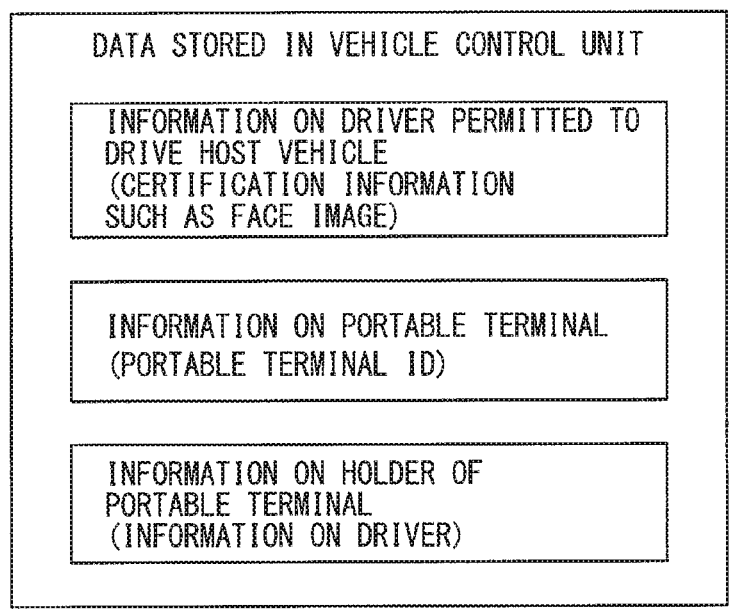
FIG. 3 is a diagram for explaining data stored in a memory of a vehicle control unit.

As indicated in FIG. 3, the memory (for example, EEPROM 21d) of the vehicle control unit 3 stores the information on a driver who is permitted to drive the host vehicle to be registered previously.

This information on the driver includes the certification information based on the face image which can identify the driver; it further includes various kinds of certification information, such as a retina, a palm, and a fingerprint. In addition, the EEPROM 21d stores the information on the portable terminal 1 of the communication partner at the present control. The information on the portable terminal 1 includes a number (for example, portable terminal ID) which identifies the portable terminal 1.

Furthermore, the EEPROM 21d stores the information on the holder of the portable terminal 1. The information on the holder includes a number (for example, holder ID) which identifies the holder. In the present first embodiment, the holder of the portable terminal 1 is a driver who is permitted to drive the vehicle; the holder of the portable terminal 1 at least needs to accord with the driver in cases where the driver monitoring process mentioned later is performed.

[1-3. Functional Contents of Microcomputer]

The following explains functionally contents executed by the respective microcomputers 17 and 21.

<Portable Terminal>

Figure 4:
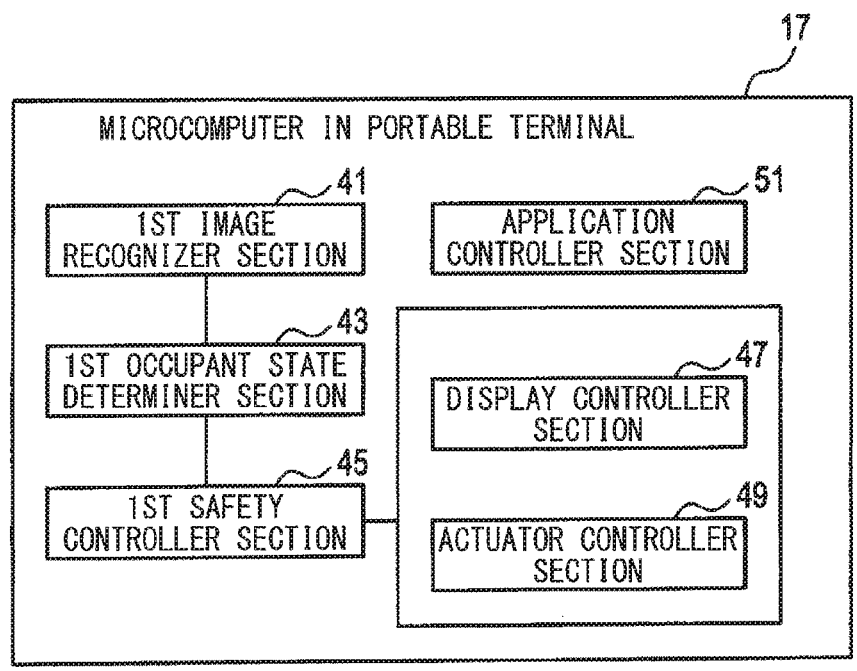
FIG. 4 is a block diagram illustrating functionally contents executed by a microcomputer of a portable terminal.

As indicated in FIG. 4, the microcomputer 17 of the portable terminal 1 includes a first image recognizer section 41, a first occupant state determiner section 43, a first safety controller section 45, a display controller section 47, an actuator controller section 49, and an application controller section 51, as processing contents of the program, i.e., functional blocks.

The first image recognizer section 41 recognizes a face image which indicates a face based on an image captured by the camera 5; then, it determines from the face image whether the image-captured human being is the holder of the portable terminal 1.

The first occupant state determiner section 43 determines whether the driver of the host vehicle looks at the display screen 11a of the portable terminal 1 during running of the host vehicle, for example, during an automated driving, based on an image captured by the camera 5. In the present case, the driver of the host vehicle according with the holder of the portable terminal 1 is previously confirmed; thus, whether the holder of the portable terminal 1 looks at the display screen 11a only needs to be determined. The running state of the host vehicle may be acquired from the vehicle control unit 3.

The first occupant state determiner section 43 can determine a degree of driver's consciousness condition based on the image (that is, face image) captured by the camera 5. The degree of the consciousness condition is a degree (that is, level) of clearness of consciousness, for example, the degree of arousal.

The degree of the consciousness condition (for example, the degree of arousal) can be detected from the opening and closing condition of the eyelids acquired from the face image, or from the heartbeat, the pulse, or the electroencephalogram. This is a common knowledge like the description of JP 5139470 B2, the disclosure of which is incorporated herein by reference; thus, the explanation is omitted.

In addition, when the wearable apparatus 39 which can detect the heartbeat etc., the information including the heartbeat may be considered to determine the degree of the consciousness condition. The first occupant state determiner section 43 may be included in the vehicle control unit 3. That is, based on the information on the face image received from the portable terminal 1, the above state determination may be performed by the vehicle control unit 3.

When it is determined that the driver looks at the display screen 11a of the portable terminal 1 during running, e.g., during an automated driving, the first safety controller section 45 can issue a warning necessary for the corresponding running state. In addition, the information available when the driver drives may be provided, such as the information available for the backup task (for example, monitoring information). The contents of the warning can be designated based on the degree (for example, degree of arousal) of the driver's consciousness condition determined by the first occupant state determiner section 43.

The first safety controller section 45 can issue the warning to the driver from the portable terminal 1, for example using the display 11, the speaker 13, or the vibrating motor 15. In addition, the monitoring information may be provided using the display 11.

The first safety controller section 45 may be included in the vehicle control unit 3. That is, based on the information on the face image received from the portable terminal 1, the vehicle control unit 3 may perform the above state determination and issuing the warning. In this case, the warning may be performed by either the portable terminal 1 or the vehicle control unit 3.

The display controller section 47 controls the display operation by the display 11 or the function as a touch panel. The actuator controller section 49 controls the operation of the portable terminal 1 when the portable terminal 1 itself serves as an actuator. For instance, the warning can be issued to the driver from the portable terminal 1 using the display 11, the speaker 13, or the vibrating motor 15 as an actuator.

The application controller section 51 controls the operations of various kinds of applications installed in the portable terminal 1, as conventionally known.

<Vehicle Control Unit>

Figure 5:
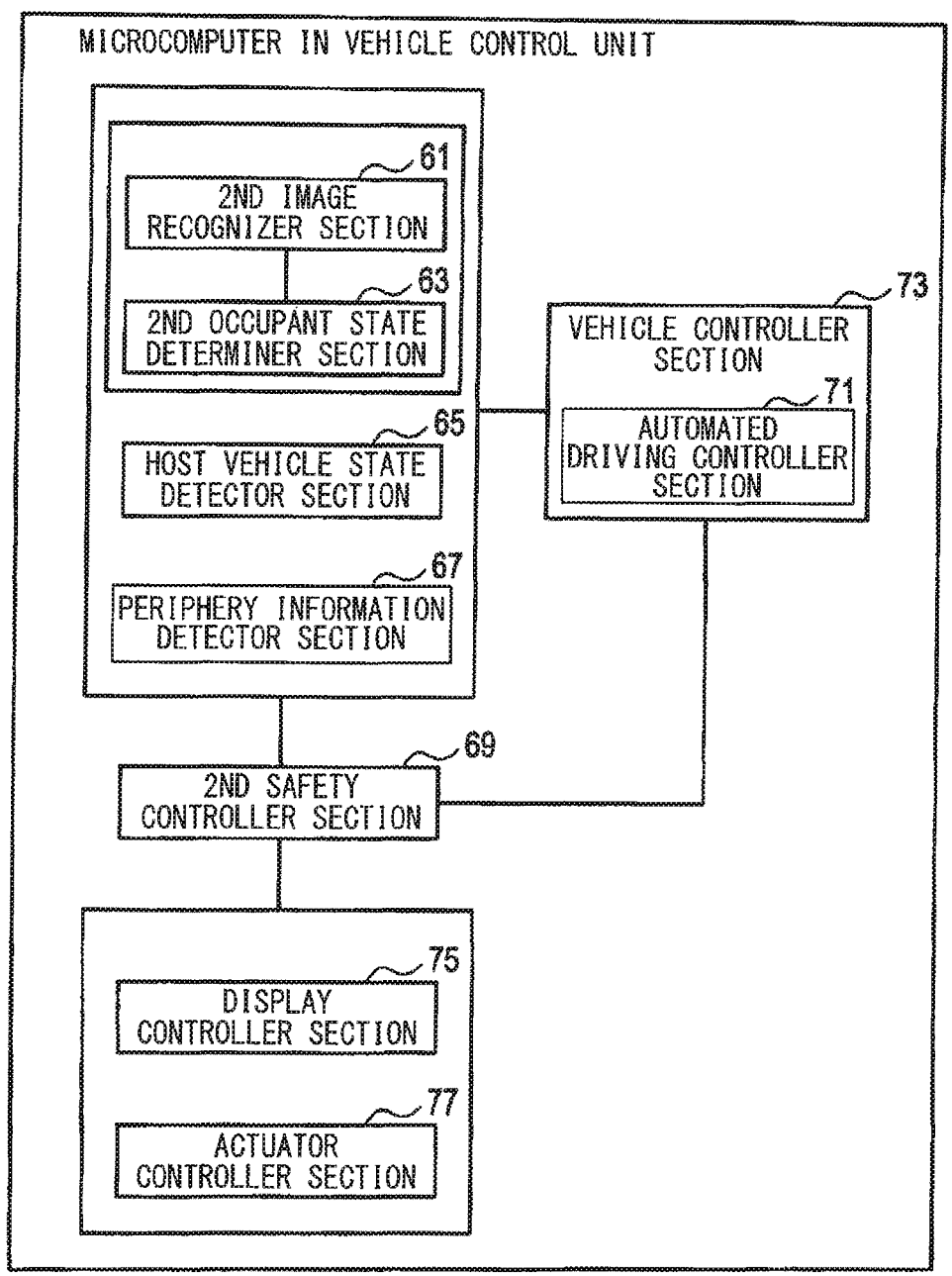
FIG. 5 is a block diagram illustrating functionally contents executed by a microcomputer of a vehicle control unit.

As illustrated in FIG. 5, the microcomputer 17 of the vehicle control unit 3 includes a second image recognizer section 61, a second occupant state determiner section 63, a host vehicle state detector section 65, a periphery information detector section 67, a second safety controller section 69, a vehicle controller section 73 which includes an automated driving controller section 71, a display controller section 75, and an actuator controller section 77, as contents of processing executed by the program, i.e., as functional blocks.

The second occupant state determiner section 63 recognizes the driver or determines various kinds of states of the driver based on the information from the second image recognizer section 61. For example, based on the image from the driver camera 25a, it is determined whether a human being who is seated in the driver's seat is permitted to drive the host vehicle.

In addition, the second occupant state determiner section 63 detects the degree of the driver's consciousness condition, for instance, the degree of arousal, and/or the degree of drowsiness (that is, functioning as a consciousness detector section). As conventionally known, the degree of the consciousness condition may be detected based on the information on the face image from the driver camera 25a, for example, the opening and closing state of the eyelids. As conventionally known, the degree of the consciousness condition may be detected based on the information from the wearable apparatus 39 or the electrocardiography sensor attached to the steering wheel or the seat belt, for instance, fluctuation of the heartbeat.

The host vehicle state detector section 65 detects the running state of the host vehicles, such as a vehicle speed, an acceleration, a yaw rate, and a steering angle based on the information from the sensors 27 for the host vehicle. In addition, the information on whether an automated driving is executed, and/or the information on the level of the automated driving are detected.

The peripheral information detector section 67 detects the information on a road condition ahead of the host vehicle and/or the information on a peripheral vehicle based on the information from the periphery monitoring apparatuses 29, such as a radar and/or a front camera. The vehicle controller section 73 controls the running of the host vehicle based on the information from the switches 31, the touch panel of the display 33, the second occupant state determiner section 63, the host vehicle state detector section 65, and the peripheral information detector section 67, for instance.

In addition, in an automated driving, the automated driving controller section 71 controls the running with the automated driving based on various kinds of information mentioned above. When controlling running such as an automated driving, the map information from the navigation apparatus 37 can be referenced.

When it is determined that the driver looks at the display screen 11a of the portable terminal 1 during running, e.g., during an automated driving, the second safety controller section 69 can issue a warning necessary for the corresponding running state, similar in the portable terminal 1. For example, the warning can be issued to the driver from the vehicle by using the display 33, or the actuators 35.

In detail, the method of issuing the warning includes a display operation by the display 33 or announcing operation by the speaker via a speech or a sound. In addition, in order to create an awareness of the warning being issued, an air-conditioner may be controlled to send cold blast to the driver, or a lighting state of an indoor lamp may be changed. Further, the seat and/or the steering wheel may be vibrated; the seat belt may be winded up. In addition, an operation of the vehicle may be controlled. the vehicle may be subjected to meandering control; the vehicle may be subjected to the braking control by the brake, for example, the braking control applying weak braking operation intermittently.

In addition, the second safety controller section 69 can provide the information available when the driver drives, such as the information available for the backup task. The information may be provided by using a head up display which displays an image on the windshield, in addition to the display 33.

The display controller section 75 controls the display operation by the display 33 and/or the function as a touch panel. The actuator controller section 77 controls the operation of the various apparatuses in the vehicle when the apparatuses each serve as an actuator. In detail, the display 33, the speaker, the lamp, or at least one of actuators for driving, braking, and steering may be used as an actuator to issue a warning or provide the information from the vehicle to the driver.

As explained above, the various functions are shared by the portable terminal 1 and the vehicle control unit 3. Another configuration may be provided. For instance, capturing a face is achieved by the camera 5 of the portable terminal 1; in contrast, subsequent processes and/or controls may be achieved by either the portable terminal 1 or the vehicle control unit 3 as needed. Alternatively, subsequent processes and/or controls may be achieved by both the portable terminal 1 and the vehicle control unit 3.

[1-4. Control Contents According to Levels of Automated Driving]

The following explains the levels of an automated driving and the control contents of the driver monitoring process performed depending on the level of the automated driving.

Whether to start an automated driving can be determined by an instruction from the driver, for instance, via the switches 31 or the touch panel of the display 33. In addition, the level of the automated driving can be selected by an instruction from the driver similarly. In contrast, when the vehicle satisfies a condition to enable the automated driving, the level of the automated driving may be designated automatically according to the condition that is satisfied.

Furthermore, whether to stop an automated driving may be determined by an instruction from the driver. In contrast, when the condition enabling the automated driving comes to be unsatisfied, the automated driving may be cancelled after an appropriate warning is issued and the safety at the time of canceling the automated driving is then confirmed.

The level of automated driving is an index to what extent automation is permitted. The levels of the automated driving can employ the levels indicated in Table 1 and Table 2 below, for instance.

TABLE 1

| Level | | Definition of level |
|---|---|---|
| Human driver monitors the driving environment | 0 | the full-time performance by the human driver of all aspects of the dynamic driving task, even when enhanced by warning or intervention systems |
| | 1 | the driving mode-specific execution by a driver assistance system of any one of steering, accelerating, and braking using information about the driving environment and with the expectation that the human driver perform all remaining aspects of the dynamic driving task |
| | 2 | the driving mode-specific execution by one or more driver assistance systems of all of steering, accelerating, and braking using information about the driving environment and with the expectation that the human driver perform all remaining aspects of the dynamic driving task |
| Automated driving system monitors the driving environment | 3 | the driving mode-specific performance by an automated driving system of all aspects of the dynamic driving task with the expectation that the human driver will respond appropriately to a request to intervene |
| | 4 | the driving mode-specific performance by an automated driving system of all aspects of the dynamic driving task, even if a human driver does not respond appropriately to a request to intervene |
| | 5 | the full-time performance by an automated driving system of all aspects of the dynamic driving task under all roadway and environmental conditions that can be managed by a human driver |

The level 0 in Table 1 indicates a driving operation performed by a driver instead of automated driving. In addition, the level 5 indicates a full-time automated driving by a vehicle itself without any driver intervening. The levels 1 to 4 each indicate a partial automated driving by cooperation between a driver and a vehicle. That is, each of the levels 1 to 4 is a system in which a driver operates the vehicle at a time and the vehicle itself drives at a time, as needed.

TABLE 2

| Level | Function | Driving operation (Dynamic driving task) | Monitoring of driving environment (Monitoring task) | Fallback performance (Backup) | Automated system capability |
|---|---|---|---|---|---|
| 0 | No Automation | Human driver (Hands-on) | Human driver (Eyes-on) | Human driver | Specific driving modes |
| 1 | Driver assistance | Human driver and system (Hands-on) | Human driver (Eyes-on) | Human driver | Specific driving modes |
| 2 | Partial Automation | System (Hands-on) | Human driver (Eyes-on) | Human driver | Specific driving modes |
| 3 | Conditional Automation | System (Hands-off) | System (Eyes-off) | Human driver | Specific driving modes |
| 4 | High Automation | System (Hands-off) | System (Eyes-off) | System | Specific driving modes |
| 5 | Full Automation | System (Hands-off) | System (Eyes-off) | System | All driving modes |

Note that in Table 2, "Hands-on" indicates a state where a driver needs to put their hand on a steering wheel during running; "Hands-off" indicates a state where a driver is enabled to release their hand from the steering wheel during running.

In addition, "Eyes-on" indicates a state where a driver needs to monitor the periphery during running to be able to drive the vehicle by taking over the driving task from the automated driving; "Eyes-off" indicates a state where the driver does not need to monitor the periphery during running.

The specific mode indicates a condition that the vehicle runs on a traffic lane enabling an automated driving, for instance. In the first embodiment, as in Table 3, the contents of the warning are set depending on the levels of the automated driving so as to provide the necessary information.

TABLE 3

| Level | Control condition | Contents |
|---|---|---|
| 0 | look at smart phone | warning "concentrate on driving" |
| 1 | look at smart phone | warning "concentrate on driving" |
| 2 | look at smart phone | warning "monitor driving environment" |
| 3 | manipulate smart phone + conscious level being high | (A): presenting information necessary for monitoring task |
|   | manipulate smart phone + conscious level being low or going to be low | (A) + warning "wake up"/"take rest at the next service area" |
|   | manipulate smart phone + needing or nearly needing backup | warning "take over the dynamic driving task" or "prepare to take over the dynamic driving task" |
| 4 | condition enabling the automated running becoming unsatisfied or nearly unsatisfied | warning "road segment enabling the automated driving ends or ends soon" |
| 5 | arrive at the destination while looking at smart phone | warning "arriving at the destination" |

In detail, the level 0 signifies that the vehicle is driven by the driver operating. At the level 0, in cases where the driver looks at the display screen 11a of the portable terminal 1 (e.g., a smart phone), an issue is posed in the safety aspect. The warning "please concentrate on driving" is thus issued, for instance. For example, the warning is issued via display or speech from the portable terminal 1 and/or the vehicle using the displays 11 and 33 and/or the speaker 13.

The level 1 signifies that the vehicle is driven with a driver assistance system needed. At the level 1, in cases where the driver looks at the display screen 11a of the portable terminal 1, a certain countermeasure is needed. For example, the warning "please concentrate on driving" is issued using the devices similar to those at the level 0.

The level 2 signifies that the vehicle is driven with a partial automated driving. At the level 2, in cases where the driver looks at the display screen 11a of the portable terminal 1, a certain countermeasure is needed similarly. For example, the warning "please monitor the driving environment" is issued using the devices similar to those in the above. That is, the driver is enabled to release their hand from the steering wheel, but it is inappropriate for the driver to take their eyes off from the periphery. The warning is thus issued to prompt the driver to monitor the periphery.

At the time of such warning, the monitoring information may be preferably presented; the monitoring information is needed for the driver to monitor the periphery while driving, such as an image captured by a front camera, a scheduled travel route of the host vehicle, or the information on the vehicles in the periphery. The monitoring information may be displayed in a part of the display screen 11a, enhancing the safety further. Note that the monitoring information may be displayed in an entire part of the display screen 11a.

At the level 3, in cases where the driver manipulates the portable terminal 1 under the driver's consciousness condition (that is, consciousness level) being high, the driver is enabled to take over the dynamic driving task at any time. That is, since a backup task is enabled, the control A is performed which corresponds to presenting (A) in Table 3 used as an auxiliary control in performing the backup task. The magnitude of the consciousness level can be determined based on a predetermined determination value.

In detail, an image captured by a front camera, a scheduled travel route of the host vehicle, or the information on the vehicles in the periphery may be projected onto the windshield to be presented as the monitoring information necessary for monitoring the periphery, for instance.

In addition, the monitoring information may be presented using the display screen 11a of the portable terminal 1. Note that presenting of the monitoring information can be performed from at least either the vehicle or the portable terminal 1.

At the level 3, in cases where the driver manipulates the portable terminal 1 under the driver's consciousness condition being low or being apt to be low, the backup task may not be fully performed. Thus, while presenting the information with the control A, the warning, e.g., "please rest at the next service area" may be issued.

As mentioned above, the monitoring information may be presented using the display screen 11a of the portable terminal 1. Note that presenting of the monitoring information can be performed from at least either the vehicle or the portable terminal 1.

At the level 3, in cases where the driver manipulates the portable terminal 1 under the state needing or likely needing the dynamic driving task operated by the driver, the necessity of the backup task is high. The warning "please take over the dynamic driving task" or "please prepare to take over the dynamic driving task" may be issued depending on the situation.

As mentioned above, the monitoring information may be presented using the display screen 11a of the portable terminal 1. Note that presenting of the monitoring information can be performed from at least either the vehicle or the portable terminal 1.

At the level 4, in cases where the condition enabling the automated driving becomes unsatisfied or nearly unsatisfied (e.g., the road segment enabling the automated driving ends or ends soon), the dynamic driving task operated by the driver is necessary. The warning "the road segment enabling the automated driving ends" or "the road segment enabling the automated driving ends soon" may be issued depending on the situation. Note that "soon" may be replaced with a word using the time such as "in ten minutes".

As mentioned above, the monitoring information may be presented using the display screen 11a of the portable terminal 1. Note that presenting of the monitoring information can be performed from at least either the vehicle or the portable terminal 1.

At the level 5, in cases where the vehicle arrives at a destination while the driver is looking at the display screen 11a of the portable terminal 1, the warning such as "arriving at the destination" may be issued. The controls are performed depending on the levels of the automation as mentioned later. The controls are defined based on the classes according to the levels of 0 to 5 in Table 3. In addition, each class (e.g., level 3) in Table 3 is divided into sub-classes, based on which the controls are further defined. That is, the controls are not limited to be performed according to the levels 0 to 5 of the automated driving. The controls may be performed according to the more classes sub-divided from the levels 0 to 5.

[1-5. Process]

The following explains contents of the process performed by the driver monitoring system, i.e., the driver monitoring process.

<Process by Portable Terminal Before Running>

The process before running may be started when the ignition switch of the host vehicle is turned ON, for example. In addition, the drawings illustrating subsequent flowcharts describe Step as S.

Figure 6:
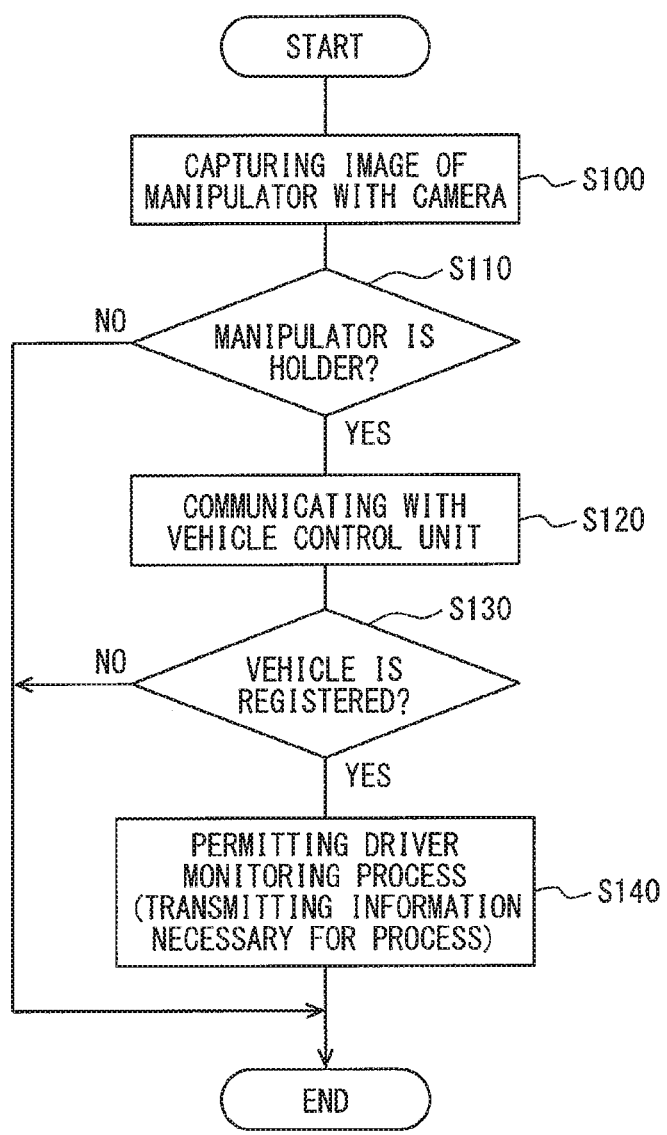
FIG. 6 is a flowchart illustrating a process executed by a microcomputer of a portable terminal before running.

First, the prior process performed in the portable terminal 1 before running is explained. As illustrated in FIG. 6, at Step 100, an image of a manipulator of the portable terminal 1 is captured with the camera 5 of the portable terminal 1.

At Step 110, it is determined whether the manipulator is a proper holder of the portable terminal 1 from the captured image (for example, face image) based on the certification information stored in the EEPROM 17d. When the affirmative determination is made, the sequence proceeds to Step 120. In contrast, when the negative determination is made, the present process once ends.

At Step 120, since the proper holder manipulates the portable terminal 1, the communication with the vehicle control unit 3 is performed. In detail, the information on the portable terminal 1 (for example, portable terminal ID) and the information on the holder are transmitted to the vehicle control unit 3. In addition, the information (for example, vehicle ID) which identifies the vehicle is received from the vehicle control unit 3.

At Step 130, it is determined whether the vehicle is a registered specified vehicle based on the information received from the vehicle control unit 3. That is, it is determined whether the vehicle is enabled to be driven by the holder of the portable terminal 1. When the affirmative determination is made, the sequence proceeds to Step 140. In contrast, when the negative determination is made, the present process once ends.

At Step 140, the driver monitoring process mentioned later is permitted since the vehicle of the communication partner is a vehicle which is enabled to be driven by the holder of the portable terminal 1. That is, the transmission of the information (for example, face image) necessary for the process is permitted; then, the present process once ends.

<Process by Vehicle Control Unit before Running>

Figure 7:
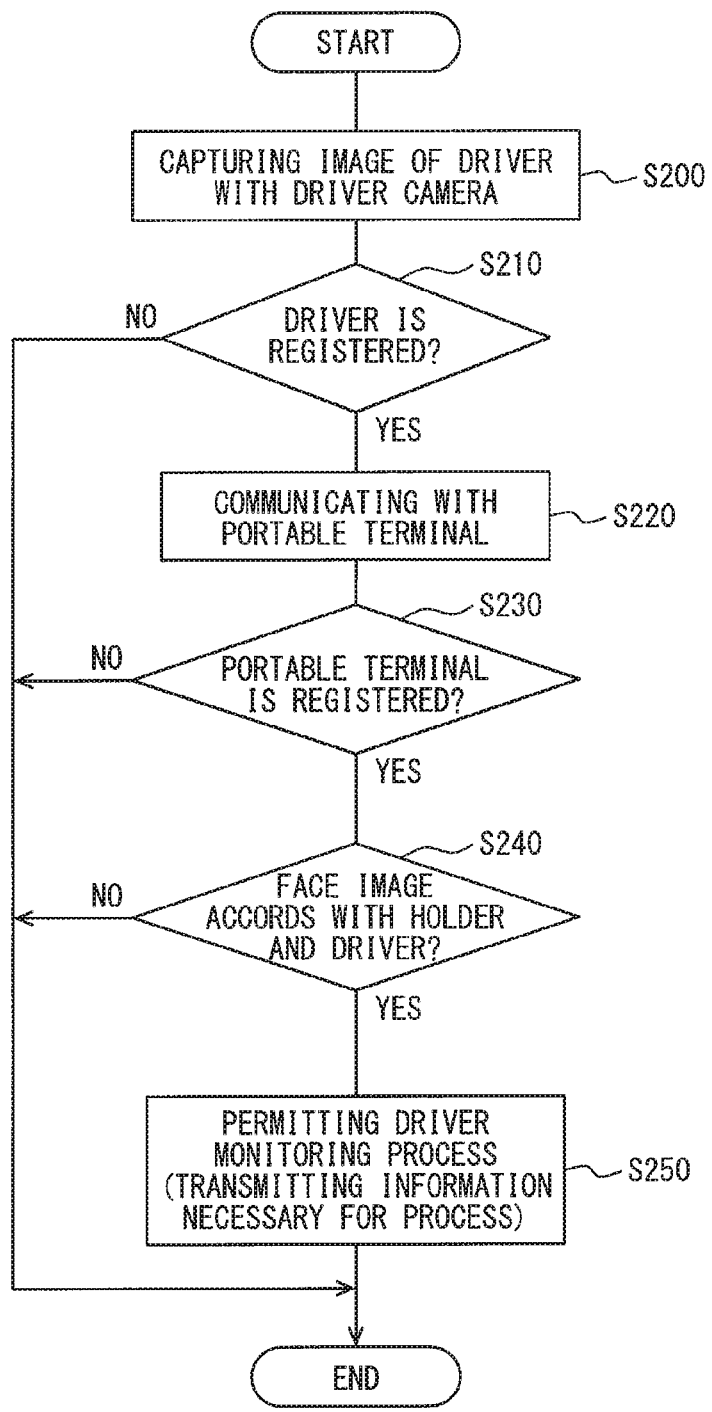
FIG. 7 is a flowchart illustrating a process executed by a microcomputer of a vehicle control unit before running.

The prior process performed by the vehicle control unit 3 before running is explained. As illustrated in FIG. 7, at Step 200, an image of the face etc. of the human being who is seated on the driver's seat is captured with the driver camera 25a in the vehicle. Being seated on the driver's seat may be detected from a sitting sensor in the driver's seat, for instance.

At Step 210, it is determined whether the human being seated is a proper driver permitted to drive the vehicle from the captured image (for example, face image) based on the certification information stored in the EEPROM 21d. When the affirmative determination is made, the sequence proceeds to Step 220. In contrast, when the negative determination is made, the present process once ends.

At Step 220, since the proper driver is seated on the driver's seat, the communication with the portable terminal 1 is performed. In detail, the information on the vehicle (for example, vehicle ID) and the information on the driver are transmitted to the portable terminal 1. In addition, the information (for example, portable terminal ID) which identifies the portable terminal 1 and the face image captured with the camera 5 of the portable terminal 1 are received from the portable terminal 1.

At Step 230, it is determined whether the portable terminal 1 is a registered specified portable terminal 1 using the portable terminal ID received from the portable terminal 1. When the affirmative determination is made, the sequence proceeds to Step 240. In contrast, when the negative determination is made, the present process once ends.

At Step 240, it is determined whether the received face image is a driver's face image based on the certification information of the driver's face image stored in the EEPROM 21d using the information on the face image received from the portable terminal 1. Note that the driver needs to accord with the holder of the portable terminal 1; thus, the determination for the accordance of the driver's face image performed is the same as that for the accordance of the holder's face image. When the affirmative determination is made, the sequence proceeds to Step 250. In contrast, when the negative determination is made, the present process once ends.

At Step 250, the driver monitoring process mentioned later is permitted since the human being who manipulates the portable terminal 1 of the communication partner is a driver who is permitted to drive the vehicle. That is, the transmission of the information necessary for the process, such as the information which activates an actuator in the portable terminal 1; then, the present process once ends.

<Process During Running>

Figure 8:
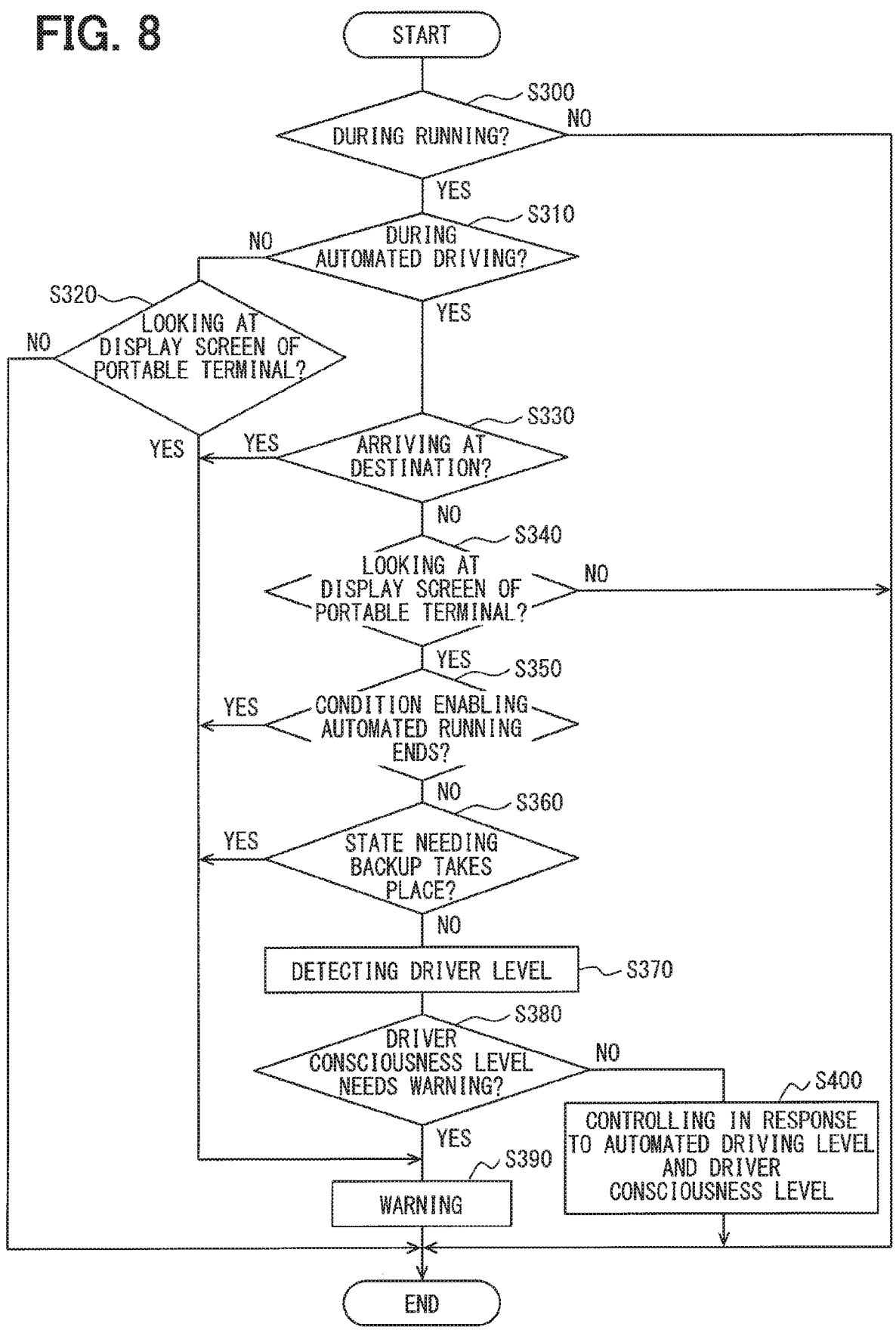
FIG. 8 is a flowchart illustrating a driver monitoring process executed by a microcomputer of a vehicle control unit during running.

The following explains a driver monitoring process performed by the vehicle control unit 3 using a flowchart in FIG. 8.

As illustrated in FIG. 8, at Step 300, it is determined whether the host vehicle is during running. When the affirmative determination is made, the sequence proceeds to Step 310. In contrast, when the negative determination is made, the present process once ends. For example, it is determined that the host vehicle is during running in response to that the speed of the host vehicle is 5 km per hour or greater.

At Step 310, it is determined whether the host vehicle is during an automated driving. When the affirmative determination is made, the sequence proceeds to Step 330. In contrast, when the negative determination is made, the sequence proceeds to Step 320. For example, suppose a case where a signal which indicates an automated driving is inputted to the vehicle control unit 3 from the switches 31 or the touch panel of the display 33, and the automated driving is thereby started and continues. In such a case, it is determined the host vehicle is during the automated driving.

Note that during an automated driving, a flag which illustrates that the vehicle is during an automated driving (for example, an automated driving flag) or a flag which illustrate the level of an automated driving (for example, a level flag) is set up; such a flag is stored in the RAM 21*c* or the EEPROM 21*d*.

At Step 320, since the vehicle is during running with the dynamic driving task operated by the driver, it is determined whether the driver looks at the display screen 11*a* of the portable terminal 1. When the affirmative determination is made, the sequence proceeds to Step 390. In contrast, when the negative determination is made, the present process once ends.

That is, it is determined whether the driver looks at the display screen 11*a* based on the image of the side which looks at the display screen 11*a* transmitted from the portable terminal 1, such as the driver's face image. Note that whether the driver looks at the display screen 11*a* can be determined from the direction of the face, the direction of the pupils of the eyes, etc. That is, when the face or the pupils look at the front, it can be determined that the driver looks at the display screen 11*a*.

When the driver looks at the display screen 11*a* of the portable terminal 1 in spite of not during an automated driving, an issue is posed in the safety aspect. The sequence thus proceeds to Step 390, where an appropriate warning is issued to respond to the situation. In detail, a countermeasure responding to the level 0 in Table 3 is to issue the warning "please concentrate on driving" etc.; then, the present process once ends.

Note that issuing the warning can be performed with the various kinds of apparatuses in the vehicle, for example, via display by the display 33 or via speech by the actuators 35, etc. In addition, it may be performed with the various kinds of apparatuses in the portable terminal 1, for example, via display by the display 11 and/or via speech by the speaker 13. Further, it may be performed in both the vehicle and the portable terminal 1. Note that issuing the warning may be similarly performed in the following.

Further, another manner for alerting the driver may be performed along with the warning, in order to teach that the warning is important. For instance, the portable terminal 1 and/or an apparatus in the vehicle is vibrated; the air-conditioner etc. is controlled to be activated. Note that alerting the driver may be similarly performed in the following.

In contrast, at Step 330, it is determined whether the vehicle arrives at the destination during the automated driving. When the affirmative determination is made, the sequence proceeds to Step 390. In contrast, when the negative determination is made, the sequence proceeds to Step 340. Note that whether the vehicle arrives at the destination may be determined using the information from the navigation apparatus 37 etc.

At Step 390, since the vehicle arrives at the destination during the automated driving, an appropriate warning is issued to respond to the situation. In detail, a countermeasure responding to the level 5 in Table 3 is to issue the warning "arriving at the destination" etc.; then, the present process once ends.

In contrast, at Step 340, it is determined whether the driver looks at the display screen 11*a* of the portable terminal 1 during the automated driving. When the affirmative determination is made, the sequence proceeds to Step 350. In contrast, when the negative determination is made, the present process once ends.

At Step 350, it is determined whether or not the automated running enabled condition ends or approaches the end. When the affirmative determination is made, the sequence proceeds to Step 390. In contrast, when the negative determination is made, the sequence proceeds to Step 360.

That is, whether or not the road segment enabling running with the automated driving (i.e., automated running) ends or ends soon is determined based on the information from the navigation apparatus 37 and/or the roadside unit. Note that whether or not the road segment enabling automated running ends or ends soon may be determined by determining at which position the vehicle is running in the road segment enabling automated running based on the map information of the navigation apparatus 37.

At Step 390, since the road segment enabling automated running ends or ends soon, an appropriate warning is issued to respond to the situation. In detail, a countermeasure responding to the level 4 in Table 3 is to issue the warning "road segment enabling the automated driving ends" or "road segment enabling the automated driving ends soon"; then, the present process once ends.

At this time, as mentioned above, the monitoring information may be presented from the vehicle and/or the portable terminal 1. In contrast, at Step 360, it is determined whether the operation by the driver of the dynamic driving task (i.e., backup task) is needed or is likely to be needed. That is, it is determined whether or not an operation by the driver is necessary, or an operation by the driver is presumed to be necessary. When the affirmative determination is made, the sequence proceeds to Step 390. In contrast, when the negative determination is made, the sequence proceeds to Step 370.

For instance, the state where a backup task operated by the driver is necessary or is presumed to be necessary may include a state where the information necessary for the automated driving becomes hard to be acquired. For example, the states needing a backup task may include a state where the deterioration of the weather interferes with the acquisition of an image with a front camera or reduces the accuracy in the image, or a state where the blur of the white line interferes with the accurate recognition of traffic lanes. Further, the state where a backup task operated by the driver is presumed to be necessary may include a state where the information necessary for the automated driving decreases gradually.

At Step 390, since the state takes place where a backup task operated by the driver is necessary or is presumed to be necessary, an appropriate warning is issued to respond to the situation. In detail, a countermeasure responding to the third column of the level 3 in Table 3 is to issue the warning "please take over the dynamic driving task" or "please prepare to take over the dynamic driving task"; then, the present process once ends.

At this time, as mentioned above, the monitoring information may be presented from the vehicle and/or the portable terminal 1. The state where a backup task operated by the driver is necessary may include a state where the weather or road condition interferes with the acquisition of the information necessary for the automated driving, as mentioned above. Further, the state where a backup task operated by the driver is presumed to be necessary may include a state where the accuracy of the information necessary for automated driving reduces, or a state where the amount of information reduces.

In contrast, at Step 370, the degree (i.e., the level) of the driver's consciousness condition is detected. For example, the degree of arousal is detected from the opening and closing state of the eyelid as a consciousness level based on the face image captured with the camera 5 of the portable terminal 1, as conventionally known. For example, when the ratio of the eyelid closed state is greater than usual, it is determined that the degree of arousal falls.

In addition, suppose a case where at least one kind of a heartbeat, a pulse, and a brain wave is detectable using the wearable apparatus 39 and/or another measuring device. Under such a case, the degree of arousal may be detected using such the living body information. Alternatively, the information on the degree of arousal acquired from the face image may be added to the living body information, so as to determine more accurate degree of arousal.

At Step 380, it is determined whether the driver's consciousness level is a level which needs a warning. When the affirmative determination is made, the sequence proceeds to Step 390. In contrast, when the negative determination is made, the sequence proceeds to Step 400.

At Step 390, since the consciousness level is low, an appropriate warning is issued to respond to such a situation. In detail, a countermeasure responding to the second column of the level 3 in Table 3 is to issue the warning "please wake up" or "please take rest at the next service area", etc. Along with the above warning, the information necessary for the driver to perform a backup task is presented (i.e., the control A is performed); then, the present process once ends.

In contrast, at Step 400, since the consciousness level is high, an appropriate countermeasure is taken to respond to such a situation. In detail, a countermeasure responding to the first column of the level 3 in Table 3 is to present the information necessary for the driver to perform a backup task; then, the present process once ends.

Although the above explains the driver monitoring process performed by the vehicle control unit 3, a similar process may be performed by the portable terminal 1. For example, the portable terminal 1 may receive the information necessary for the driver monitoring process illustrated in FIG. 8 from the vehicle control unit 3, and may perform the driver monitoring process illustrated in the FIG. 8 based on the received information. Further, issuing the warning or presenting the information may be performed in either the portable terminal 1 or the vehicle, as mentioned above.

1-6. Advantageous Effects

The first embodiment described above provides advantageous effects as follows.

(1a) The first embodiment is enabled to determine whether the driver of a host vehicle looks at the display screen 11*a* of the portable terminal 1 during an automated driving, for instance, based on an image captured by the camera 5, and issue a warning in response to that the driver is determined to be looking at the display screen 11*a* of the portable terminal 1.

In addition, the useful monitoring information for the backup task by the driver may be provided during an automated running from the vehicle or the portable terminal 1 depending on the level of the automation and/or the degree of arousal.

This provides an advantageous effect improving the safety in driving.

(1b) The first embodiment is enabled to set the contents of the warning depending on the level of an automated driving during the automated driving of a host vehicle, allowing the driver to take an appropriate countermeasure according to the contents of the warning.

(1c) The first embodiment is enabled to determine the degree of the driver's consciousness condition based on the image captured with the camera 5, or based on the information from other apparatus such as the wearable apparatus 39, and set the contents of the warning based on the degree of the consciousness condition, thereby allowing the driver to take an appropriate countermeasure according to the contents of the warning.

(1d) The first embodiment is enabled to issue a warning in a host vehicle in response to that failing to detect the situation on the periphery with sufficient accuracy needs the driver's operation or likely needs the driver's operation (i.e., in response to that the host vehicle comes to be under a state being inappropriate for the automated driving or under a state being presumed to become inappropriate for the automated driving). This allows the driver to easily take over the dynamic driving task from the automated driving, improving the safety in driving.

(1e) The first embodiment is enabled to issue the warning in response to that a condition ending the automated running is satisfied, or in response that the automated running is presumed to end. This allows the driver to easily take over the dynamic driving task from the automated driving, improving the safety in driving.

(1f) The first embodiment is enabled to issue the warning relative to the information indicating that a host vehicle arrives at a destination with the automated driving.

[1-7. Correspondence Relation of Terms]

In the first embodiment, the display screen 11*a*, the camera 5, the portable terminal 1, the vehicle control unit 3, the first and second the occupant state determiner section 43 and 63, and the safety controller section 45 and 69, respectively, correspond to a display screen, an image capture apparatus, a portable unit, a vehicle control unit, an occupant state determiner section, a safety controller section, in the present disclosure.

2. Second Embodiment

The following explains a second embodiment while omitting or simplifying the explanation about contents equivalent to those of the first embodiment. The configuration equivalent to that of the first embodiment is assigned with an identical reference number and omitted from the explanation.

This second embodiment is to switch the control of the level 3 or the level 4 in Table 1 into the control of the level 1 or the level 2 in response to that a situation on driving changes.

(2a) Case of Level 3 being Switched into the Level 1

Suppose a case where the level 3 is switched into the level 1 when the driver manipulates the portable terminal 1 under the state needing or likely needing the driver to operate the dynamic driving task (e.g., under the state where the white line on the road cannot be recognized). In such switching into the level 1, the warning "please take over the operation of the steering wheel" is issued, for instance.

Note that the control of the vehicle is changed depending on the change of the levels.

(2b) Case of Level 3 being Switched into the Level 2

Suppose a case where the level 3 is switched into the level 2 when the driver manipulates the portable terminal 1 under the state needing or likely needing the driver to operate the dynamic driving task (e.g., under the state where the white line on the road cannot be recognized). In such switching into the level 2, the warning "please take over the monitoring task" or "please watch the front and drive" is issued, for instance. This monitoring task includes a work of monitoring the periphery enabling a backup task.

Note that the control of the vehicle is changed depending on the change of the levels.

(2c) Case of Level 4 being Switched into the Level 1

Suppose a case where, under the state where the driver looks at the portable terminal 1 while lying down, the level 4 is switched into the level 1 at an occurrence of a situation where the white line on the road cannot be recognized when the condition enabling the automated running becomes unsatisfied or nearly unsatisfied (e.g., the road segment enabling the automated driving ends or nearly ends). In such switching into the level 1, the warning "please take over the operation of the steering wheel" is issued.

Note that the control of the vehicle is changed depending on the change of the levels.

(2d) Case of Level 4 being Switched into the Level 2

Suppose a case where, under the state where the driver looks at the portable terminal 1 while lying down, the level 4 is switched into the level 1 at an occurrence of a situation where the white line on the road cannot be recognized when the condition enabling the automated running becomes unsatisfied or nearly unsatisfied (e.g., the road segment enabling the automated driving ends or nearly ends). In such switching into the level 2, the warning "please take over the monitoring task" or "please watch the front and drive", for instance.

Note that the control of the vehicle is changed depending on the change of the levels.

3. Other Embodiments

Although the embodiments are described above, the present disclosure is not limited to the embodiments and can be modified in various manners within a technical scope of the present disclosure.

(3a) The above embodiments describe the levels of automated driving being classified as illustrated in the Table 1, Table 2, and Table 3; for example, the classes of the levels of another automated driving may be employed as illustrated in Table 4 below.

TABLE 4

| Level | Definition of level | Classes of system | |
|---|---|---|---|
| 1 | any one of steering, accelerating, and braking by system | Safety driving assistance system | |
| 2 | simultaneously two or more of steering, accelerating, and braking by system | Semi-automated driving system | Automated driving system |
| 3 | all of steering, accelerating, and braking by system with the exception that the human driver will respond appropriately to a request to intervene | | |
| 4 | all of steering, acceleration, and braking by system other than the human driver, without any human driver's intervening | Full-time automated driving system | |

In this case, the level 1, the level 2, the level 3, and the level 4 in Table 4 are, respectively, correspond to the level 1, the level 2, the level 3, and the level 4 or level 5, in Table 1. Therefore, the control of the warning or the like may be performed according to the corresponding level.

(3b) The above embodiments describe a portable terminal such as a smart phone as an example of a portable unit. The various portable units may be employed which include a camera capturing an image of a human being who manipulates while communicating with a vehicle.

For example, such portable units may include a tablet terminal, a smart watch, a digital book terminal, a game machine, and a notebook PC.

(3c) The above embodiments perform the driver monitoring process in the portable terminal or the vehicle control unit. In contrast, another configuration may be provided such that the information necessary for the driver monitoring process is transmitted, for example, to a base station; a driver monitoring process is performed via the Internet, e.g., in a server; and the warning etc. is performed in the portable terminal and/or the vehicle.

(3d) the above embodiments describe as an example a vehicle enabling an automated driving; however, the present disclosure may be applicable also to a vehicle disabling an automated driving. In this case, in the process in FIG. 8, the sequence proceeds from Step 300 to Step 320; then the sequence proceeds to Step 390 or the present process once ends, depending on the determination result at Step 320. That is, the processing at other Steps is not performed. This provides an advantageous effect enhancing the safety during running even when the vehicle is not during an automated running.

(3e) Methods of determining the degree of arousal may include, in addition to the method mentioned above, various kinds of methods depending on a portable unit to be used. For example, the degree of arousal may be determined based on the operation frequency of a manipulation switch, a touch panel, a keyboard, a mouse, a touchpad, etc., or an uttered speech via a microphone.

That is, when the display screen of the portable unit is seen, the degree of arousal can be determined based on whether an appropriate operation is performed in conjunction with the display contents in the display screen. For example, suppose a case where when an appropriate input is requested, such an appropriate input is not performed, or the frequency of the input is low and/or the speed of the input is slow. In such a case, the degree of arousal may be determined to be falling.

(3f) Methods of calling the driver's attention when the warning is issued by the safety controller section may include the various kinds of methods. For instance, calling the driver's attention or issuing the warning may be performed via at least one kind of control in running state of a host vehicle, sound, speech, light, vibration, wind, and temperature (refer to FIG. 9).

(3g) When a portable terminal is held or manipulated, the camera of the portable terminal is activated to capture an image; using the captured image, the driver's state can be monitored or estimated (i.e., determined).

In this case, holding the portable terminal may be determined in response to that the display of the portable terminal is turned on and displays any image. In addition, manipulating the portable terminal may be determined in response to that any manipulation is applied to the touch panel etc. Furthermore, holding or manipulating the portable terminal may be determined using a G sensor comprehensively.

Alternatively, holding or manipulating the portable terminal may be determined based on the image captured with an in-vehicle camera (for example, a driver camera) attached to the vehicle. Note that when the portable terminal is neither held nor manipulated, the in-vehicle camera may be used to monitor or estimate the driver's state.

(3h) In cases where the in-vehicle camera is enabled to be used to monitor or estimate the driver's state, the camera in the portable terminal is also activated to capture an image of the driver to monitor or estimate the driver's state. This can increase the accuracy in monitoring or estimating the driver's state.

When both the in-vehicle camera and the camera of the portable terminal capture images, both the images are available but only one of them may be used.

(3i) When the driver's state cannot be recognized with the in-vehicle camera (for example, when the face image is not acquired, and/or when the image of the eyes is not acquired), the camera of the portable terminal may be activated to capture an image.

(3j) When the camera of the portable terminal may be substituted for the in-vehicle camera, the use of an in-vehicle camera may not be necessary. Suppose a case where the portable terminal is attached to a specified position of the vehicle with a cradle or a holder, or the portable terminal is arranged in a position for charging, for example. In such a case, this camera of the portable terminal may be used in place of the in-vehicle camera.

In addition, when any camera is not mounted in the vehicle, the camera of the portable terminal may be used as a camera for determining the driver's state.

(3k) Part or all of the processes (for example, the process by the occupant state determiner section) for determining the driver's state may be performed by at least one of a portable terminal, a control unit of a host vehicle (for example, a vehicle control unit which controls an operation of the host vehicle), a control unit of a different vehicle (for example, a vehicle control unit which controls an operation of the different vehicle), and an apparatus other than vehicles (refer to FIG. 10).

For example, when the processes mentioned above are performed by using other than the portable terminal and the vehicle control unit of the host vehicle, the load of the arithmetic processing of the portable terminal and/or the vehicle control unit of the host vehicle can be reduced. In addition, reducing the load of the arithmetic processing enables any one of the portable terminal, the vehicle control unit of the host vehicle, or another apparatus to perform the determination process multiple times or the determination process using many data, improving the determination precision.

The apparatus other than a vehicle includes a cloud server. In addition, a different vehicle different from the host vehicle includes a different vehicle different from the host vehicle among a plurality of vehicles such as trucks which are controlled in cooperation by an automated driving.

(3l) Part or all of the function of the occupant state determiner section may be provided to a microcomputer of the portable terminal, reducing the data volume in communications.

(3m) Further, a function of one constituent element in the above embodiments may be distributed to a plurality of constituent elements; a plurality of functions of a plurality of constituent elements in the above embodiments may be integrated into one constituent element. In addition, part of the configuration in the above embodiments may be omitted. In addition, at least a part of the configuration of each embodiment mentioned above may be added to or replaced by the configuration of another embodiment mentioned above. All the modes contained in a technical idea only identified from the terms described in claims are the embodiments of the present disclosure.

(3n) Further, the present disclosure may be achieved by the various kinds of manners, in addition to the driver monitoring system, such as a system which includes the driver monitoring system as a constituent element, a program permitting a computer to function as the driver monitoring system, a non-transitory tangible storage medium such as a semiconductor memory storing the program, or a method for monitoring a driver.

Further, part or all of the functions executed by the driver monitoring system (in particular, the vehicle control unit or the portable terminal) may be configured as a hardware circuit such as one or more ICs.

The invention claimed is:

1. A driver monitoring system monitoring a driver of a host vehicle by a vehicle control unit and a portable unit which communicate with each other, the vehicle control unit controlling the host vehicle, the portable unit having a display screen and an image capture apparatus arranged to capture an image of an area opposing the display screen,
the driver monitoring system comprising:
an occupant state determiner section configured to determine whether the driver of the host vehicle looks at the display screen of the portable unit during running of the host vehicle, based on an image captured by the image capture apparatus;
a safety controller section configured to issue a warning in response to that the occupant state determiner section determines that the driver looks at the display screen of the portable unit; and
an image recognizer section configured to determine whether the driver of the host vehicle accords with a manipulator of the portable unit based on (i) an image captured by an in-vehicle camera disposed in front of a driver seat to capture an image of the driver seat and (ii) an image captured by the image capture apparatus included in the portable unit,
wherein in response to that the driver of the host vehicle is determined to accord with the manipulator of the portable unit, the occupant state determiner section is configured to determine whether the driver of the host vehicle looks at the display screen of the portable unit during running of the host vehicle, based on the image captured by the image capture apparatus.

2. The driving monitoring system according to claim 1, wherein the safety controller section is configured to issue the warning from at least either the portable unit or the host vehicle.

3. The driving monitoring system according to claim 1, wherein
the safety controller section is configured to issue the warning using at least one of a control of a running state of the host vehicle, a sound, a speech, a light, a vibration, a wind, and a temperature.

4. The driving monitoring system according to claim 1, wherein
a part or all of a process to determine a state of the driver is executed by at least one of (i) the portable unit, (ii) a control unit in the host vehicle, (iii) a control unit in a different vehicle, and (iv) an apparatus other than a vehicle.

5. The driving monitoring system according to claim 4, wherein
the apparatus other than the vehicle is a cloud server.

6. A driver monitoring system monitoring a driver of a host vehicle by a vehicle control unit and a portable unit which communicate with each other, the vehicle control unit controlling the host vehicle, the portable unit having a display screen and an image capture apparatus arranged to capture an image of an area opposing the display screen, the driver monitoring system comprising:
an occupant state determiner section configured to determine whether the driver of the host vehicle looks at the display screen of the portable unit during an automated driving of the host vehicle, based on an image captured by the image capture apparatus; and
a safety controller section configured to perform a control of issuing a warning in response to that the occupant state determiner section determines that the driver looks at the display screen of the portable unit.

7. The driving monitoring system according to claim 6, wherein
the safety controller section is configured to set a content of the warning depending on a level of the automated driving.

8. The driving monitoring system according to claim 6, wherein
the safety controller section is configured to provide information depending on a level of the automated driving.

9. The driving monitoring system according to claim 6, wherein:
the occupant state determiner section is configured to determine a degree of consciousness of the driver based on an image captured by the image capture apparatus; and
the safety controller section is configured to perform setting a content of the warning based on a degree of consciousness of the driver determined by the occupant state determiner section.

10. The driving monitoring system according to claim 6, wherein
the occupant state determiner section is provided in either the portable unit or the vehicle control unit.

11. The driving monitoring system according to claim 6, wherein
the safety controller section is configured to issue the warning either (i) when an operation by the driver is necessary, or (ii) when an operation by the driver is presumed to be necessary.

12. The driving monitoring system according to claim 6, wherein the safety controller section is configured to issue the warning either (i) when a condition to end the automated driving is satisfied or (ii) when the automated driving is presumed to end.

13. The driving monitoring system according to claim 6, wherein
the safety controller section is configured to issue the warning when the host vehicle arrives at a destination with the automated driving.

14. The driving monitoring system according to claim 6, wherein
the safety controller section is configured to issue the warning from at least either the portable unit or the host vehicle.

15. The driving monitoring system according to claim 6, wherein
the safety controller section is configured to issue the warning using at least one of a control of a running state of the host vehicle, a sound, a speech, a light, a vibration, a wind, and a temperature.

16. The driving monitoring system according to claim 6, wherein
a part or all of a process to determine a state of the driver is executed by at least one of (i) the portable unit, (ii) a control unit in the host vehicle, (iii) a control unit in a different vehicle, and (iv) an apparatus other than a vehicle.

17. The driving monitoring system according to claim 16, wherein
the apparatus other than the vehicle is a cloud server.

18. The driving monitoring system according to claim 6, further comprising:
an image recognizer section configured to determine whether the driver of the host vehicle accords with a manipulator of the portable unit based on (i) an image captured by an in-vehicle camera disposed in front of a driver seat to capture an image of the driver seat and (ii) an image captured by the image capture apparatus included in the portable unit,
wherein in response to that the driver of the host vehicle is determined to accord with the manipulator of the portable unit, the occupant state determiner section is configured to determine whether the driver of the host vehicle looks at the display screen of the portable unit during running of the host vehicle, based on the image captured by the image capture apparatus.

19. A driver monitoring system monitoring a driver of a host vehicle by (i) a vehicle control unit in the host vehicle and (ii) a portable unit communicating with the vehicle control unit,
the vehicle control unit controlling the host vehicle,
the portable unit including a display screen arranged on one of side faces of the portable unit and an image capture apparatus arranged on the one of the side faces of the portable unit to capture an image in front of the display screen,
the driver monitoring system comprising:
at least one control circuit configured to
determine whether the driver of the host vehicle looks at the display screen of the portable unit during an automated driving of the host vehicle, based on the image in front of the display screen of the portable unit captured by the image capture apparatus included in the portable unit; and
perform a control of providing information used by the driver in driving, in response to determining that the driver looks at the display screen of the portable unit.

20. The driver monitoring system according to claim 19, wherein
among the at least one control circuit, an individual control circuit is configured to include
(i) at least one hardware circuit including at least either an analog circuit or a digital circuit, or
(ii) at least one processing unit along with memory storing instructions, or
(iii) a combination of the at least one hardware circuit and the at least one processing unit along with memory storing instructions.

21. The driving monitoring system according to claim 19, wherein
the at least one control circuit is configured to provide the information depending on a level of the automated driving.

22. The driving monitoring system according to claim 19, wherein
the at least one control circuit is configured to provide the information depending on a level of the automated driving.

23. The driving monitoring system according to claim 19, wherein
the at least one control circuit is configured to
determine a degree of consciousness of the driver based on an image captured by the image capture apparatus, and
perform providing the information based on the determined degree of consciousness of the driver.

24. The driving monitoring system according to claim 19, wherein
the at least one control circuit is provided in either the portable unit or the vehicle control unit.

25. The driving monitoring system according to claim 19, wherein
the at least one control circuit is configured to provide the information either (i) when an operation by the driver is necessary, or (ii) when an operation by the driver is presumed to be necessary.

26. The driving monitoring system according to claim 19, wherein
the at least one control circuit is configured to provide the information either (i) when a condition to end the automated driving is satisfied or (ii) when the automated driving is presumed to end.

27. The driving monitoring system according to claim 19, wherein
the at least one control circuit is configured to provide the information when the host vehicle arrives at a destination with the automated driving.

28. The driving monitoring system according to claim 19, wherein
the at least one control circuit is configured to provide the information from at least either the portable unit or the host vehicle.

29. The driving monitoring system according to claim 19, wherein
the at least one control circuit is configured to provide the information using at least one of a control of a running state of the host vehicle, a sound, a speech, a light, a vibration, a wind, and a temperature.

30. The driving monitoring system according to claim 19, wherein
a part or all of a process to determine a state of the driver is executed by at least one of (i) the portable unit, (ii) a control unit in the host vehicle, (iii) a control unit I a different vehicle, and (iv) an apparatus other than a vehicle.

31. The driving monitoring system according to claim 30, wherein
the apparatus other than the vehicle is a cloud server.

32. The driving monitoring system according to claim 19, wherein:
the at least one control circuit is configured to determine whether the driver of the host vehicle accords with a manipulator of the portable unit based on (i) an image captured by an in-vehicle camera disposed in front of a driver seat to capture an image of the driver seat and (ii) an image captured by the image capture apparatus included in the portable unit; and
in response to that the driver of the host vehicle is determined to accord with the manipulator of the portable unit, the at least one control circuit is configured to determine whether the driver of the host vehicle looks at the display screen of the portable unit during running of the host vehicle, based on the image captured by the image capture apparatus included in the portable unit.

33. A driver monitoring system monitoring a driver of a host vehicle by a vehicle control unit and a portable unit which communicate with each other, the vehicle control unit controlling the host vehicle, the portable unit having a display screen and an image capture apparatus arranged to capture an image of an area opposing the display screen,
the driver monitoring system comprising:
an occupant state determiner section configured to determine whether the driver of the host vehicle looks at the display screen of the portable unit during an automated driving of the host vehicle, based on an image captured by the image capture apparatus;
a safety controller section configured to perform at least either a control of issuing a warning or a control of providing information used by the driver in driving, in response to that the occupant state determiner section determines that the driver looks at the display screen of the portable unit; and
an image recognizer section configured to determine whether the driver of the host vehicle accords with a manipulator of the portable unit based on (i) an image captured by an in-vehicle camera disposed in front of a driver seat to capture an image of the driver seat and (ii) an image captured by the image capture apparatus included in the portable unit,
wherein in response to that the driver of the host vehicle is determined to accord with the manipulator of the portable unit, the occupant state determiner section is configured to determine whether the driver of the host vehicle looks at the display screen of the portable unit during running of the host vehicle, based on the image captured by the image capture apparatus.

* * * * *